United States Patent [15] 3,707,608

Sugaya et al. [45] Dec. 26, 1972

[54] METHOD AND APPARATUS FOR DUPLICATING A MAGNETIC TAPE

[72] Inventors: Hiroshi Sugaya, Suita; Fukashi Kobayashi, Hirakata; Mitsuaki Ono, Osaka, all of Japan

[73] Assignee: Matsushita Electric Industrial Co., Ltd., Osaka, Japan

[22] Filed: June 28, 1971

[21] Appl. No.: 157,749

Related U.S. Application Data

[63] Continuation of Ser. No. 747,679, July 25, 1968, abandoned.

[30] Foreign Application Priority Data

| | | |
|---|---|---|
| Dec. 28, 1967 | Japan | 43/12 |
| Dec. 28, 1967 | Japan | 43/75 |
| Aug. 2, 1967 | Japan | 42/50058 |
| Aug. 10, 1967 | Japan | 42/51672 |
| Jan. 30, 1968 | Japan | 43/6449 |

[52] U.S. Cl. ....................179/100.2 E
[51] Int. Cl. ....................G11b 5/86
[58] Field of Search ........179/100.2 E; 226/190, 191, 226/196; 242/67.3, 192

[56] References Cited

UNITED STATES PATENTS

| | | | |
|---|---|---|---|
| 2,867,692 | 1/1959 | Camras | 179/100.2 E |
| 2,983,459 | 5/1961 | Gray et al. | 242/67.3 |
| 3,104,073 | 9/1963 | Post | 242/67.3 X |
| 3,333,753 | 8/1967 | Streets | 226/190 X |
| 3,370,803 | 2/1968 | Newell | 242/192 |
| 3,370,804 | 2/1968 | Peyton | 242/197 |
| 3,408,016 | 10/1968 | Ganske | 242/192 |
| 3,441,998 | 5/1969 | Furst et al. | 226/190 X |
| 3,143,270 | 8/1964 | Cohen | 242/76 |
| 3,380,679 | 4/1968 | Komas et al. | 242/67.3 |
| 3,417,934 | 12/1968 | Palm | 242/67.3 |

*Primary Examiner*—Bernard Konick
*Assistant Examiner*—Raymond F. Cardillo, Jr.
*Attorney*—Stevens, Davis, Miller & Mosher

[57] ABSTRACT

A method of and apparatus for duplicating a magnetic tape by taking-up a recorded magnetic tape of high coercive force and an unrecorded magnetic tape of low coercive force on one reel with the magnetic coating thereof in close contact with each other and impressing an alternate magnetic field externally on said tapes as they are taken up on the reel thereby to transfer a signal on said recorded tape onto said unrecorded tape.

25 Claims, 30 Drawing Figures

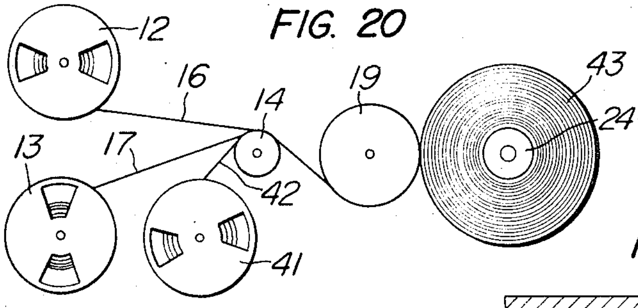
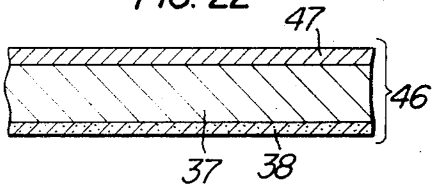
FIG. 22
FIG. 21
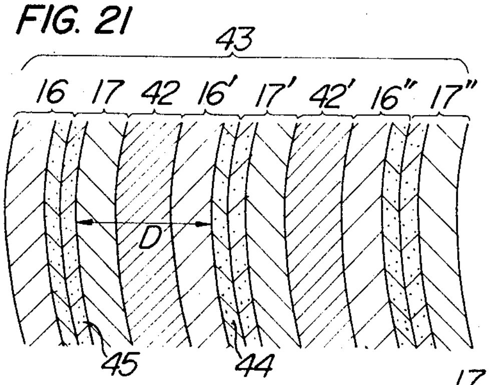
FIG. 23
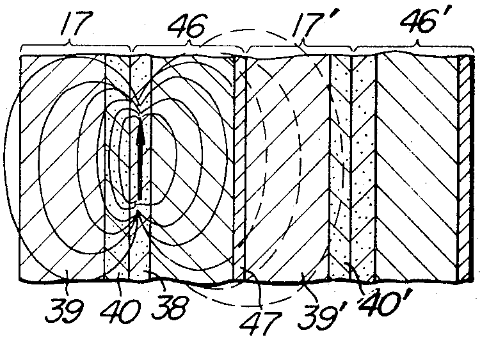
FIG. 24
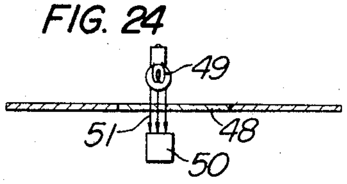
FIG. 25
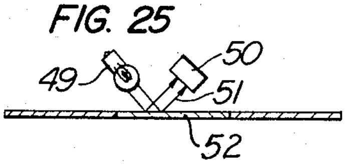
FIG. 26
FIG. 27
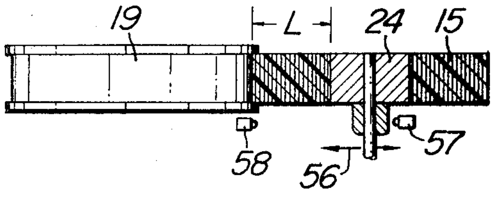

METHOD AND APPARATUS FOR DUPLICATING A MAGNETIC TAPE

This application is a continuation of application Ser. No. 747,679, filed 7/25/68 and now abandoned.

The present invention relates to a method of and apparatus for transferring a signal recorded on one magnetic tape to another magnetic tape.

In duplicating a recorded tape for a magnetic tape recorder or video tape recorder, it has been customary to record the desired signal directly on individual magnetic tapes by way of a magnetic head. As one way of duplicating a magnetic tape for a magnetic tape recorder, a method has been employed which comprises running the magnetic tape, that is, a master tape, through a magnetic head at a high speed to reproduce the signal recorded thereon, amplifying the reproduced signal and recording the reproduced signal on an unrecorded tape, running at a high speed, by way of another magnetic head. According to this method, it is necessary to run both the master tape and the copy tape at a constant high speed and the magnetic heads used must be durable to be serviceable with minimum wear even under such high-speed operating conditions. In addition, the method calls for such electronic circuits as a recording amplifier, a reproducing amplifier and a bias oscillator. Still further, when the method is used for the duplication of a tape for a rotary head-type video tape recorder, there must be provided a magnetic head capable of recording and reproducing a signal of as high as above 10 megacycles and means for rotating the magnetic head at a high speed, but it is quite difficult to provide such a magnetic head unit.

Furthermore, according to the conventional transferring method, both a recorded master tape and an unrecorded copy tape are made to run at the same speed, are brought into an intimate contact at a portion thereof with each other while running, and are impressed with a high frequency transfer magnetic field at said portion, so that the master tape and the copy tape must be in intimate contact with each other during passage through the transfer field and travel a predetermined distance at exactly the constant speed in a juxtaposed state with no widthwise displacement relative to each other. Even a slight difference in running speed between the tapes will cause the transfer effect to be markedly deteriorated. Namely, the conventional method had the drawback that the running speeds of both tapes must be equalized with considerable accuracy. Another drawback of the conventional method is that the transfer effect is extremely deteriorated by an air layer which is apt to be formed between the tapes running at a considerably high speed.

The characteristic feature of the present invention resides in a method of transferring a signal from one tape onto another, which comprises producing a master tape by recording the signal on a magnetic tape having higher coercive force than ordinary magnetic tape, bringing the magnetic coating surface of an unrecorded copy tape having smaller coercive force than that of said master tape into intimate contact with the coating surface of the master tape and winding both tapes on a reel in the juxtaposed state, and impressing an alternate magnetic field externally on the tapes wound on the reel.

According to the present invention, there is provided an apparatus for duplicating a magnetic tape by magnetic printing, which is operable at high speed without being adversely affected by a wow and flutter of the associated tape transporting apparatus and which does not involve recording and reproducing magnetic heads and electronic circuits and is therefore inexpensive.

The method of the present invention has the following advantages over the conventional tape duplicating method:

1. The recording and reproducing magnetic heads and electronic circuits, heretofore used in the duplication of a tape, are not required.

2. The running speed of the tapes can be selected freely, without regard to inconsistency of the speed.

3. Because of the advantages mentioned in Items 1 and 2 above, the cost of the apparatus is reduced and the operation is rendered easy.

4. The time required for duplication can be shortened and particularly the time required for duplicating a tape for rotary head-type VTR can be shortened to about one-twentieth to one-thirtieth of that required by the conventional method.

5. A single master tape can be used semi-permanently.

6. An improved contact can be obtained between a master tape and a copy tape, with no relative displacement of the tapes at all, so that the transferring operation can be performed with high efficiency.

7. A commercial frequency can be used for the transfer field, so that there is no need for providing an oscillator and amplifier as a transfer field source.

The present invention will be more fully understood by reading the following detailed description taken in conjunction with the accompanying drawing, in which.

Figure 6A:
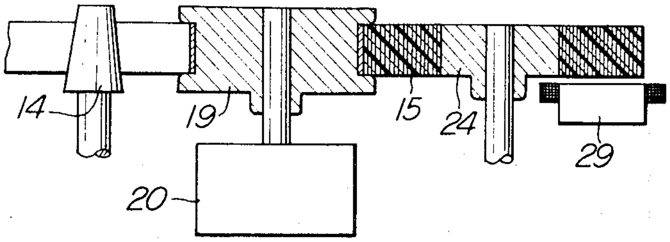
Figures 6B, 7A, 7B:
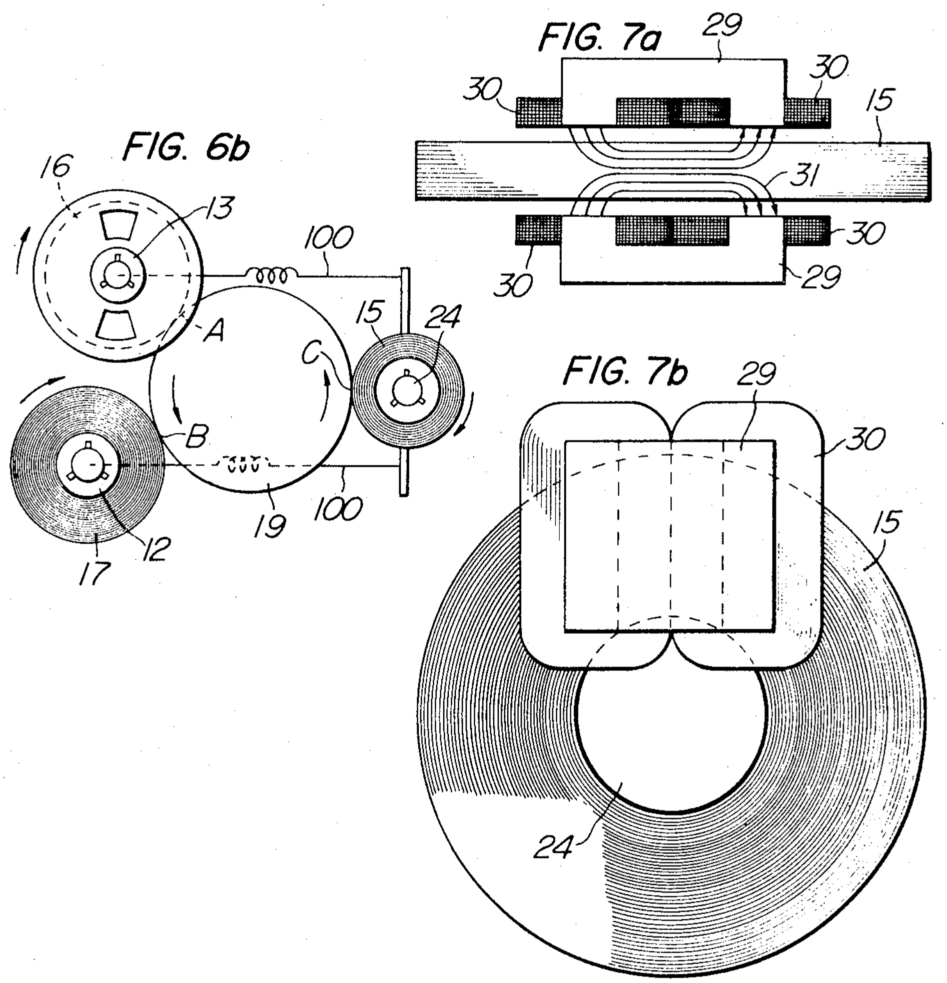
Figure 8:
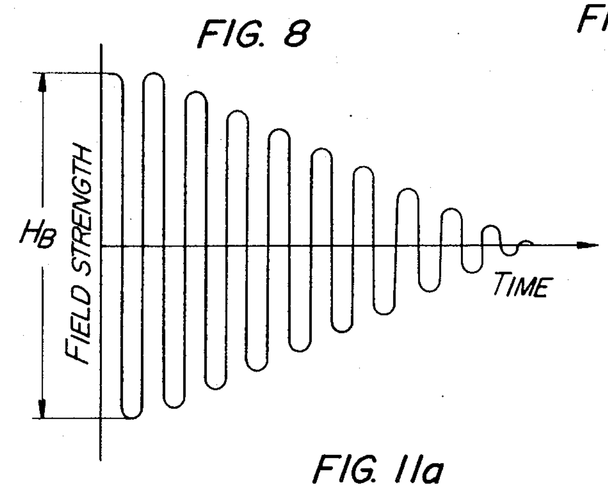
Figure 9:
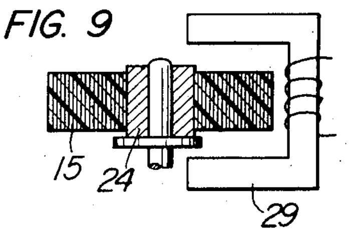
Figure 10:
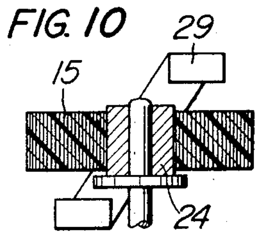
Figure 11A:
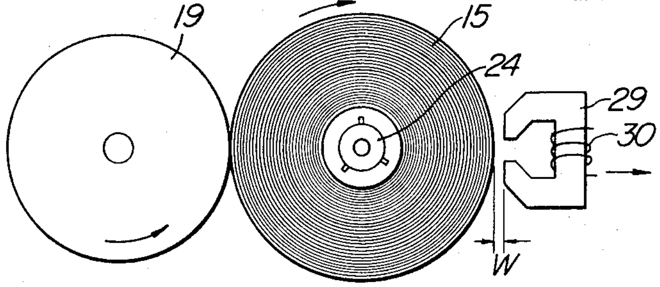
Figure 11B:
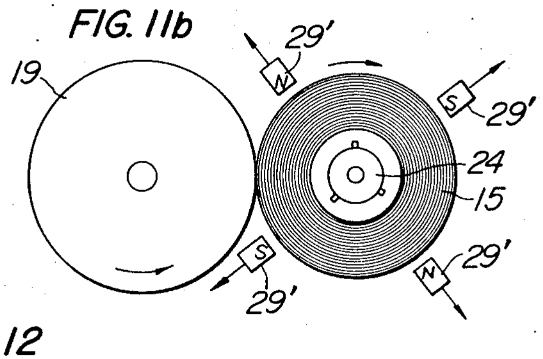
Figure 12:
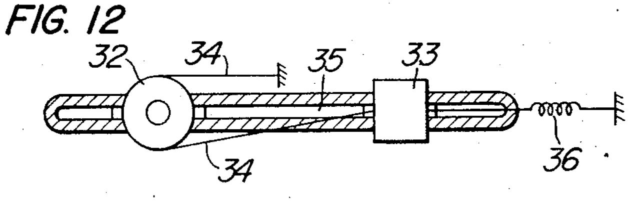
Figure 13:
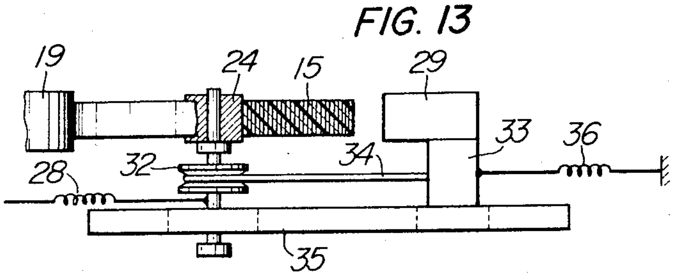
Figure 14:
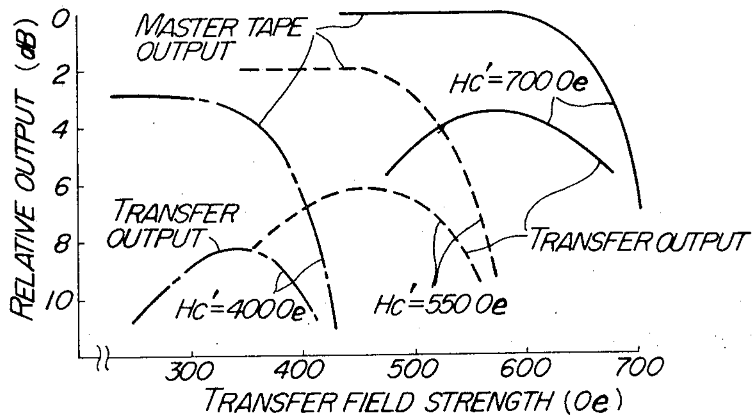
Figure 15:
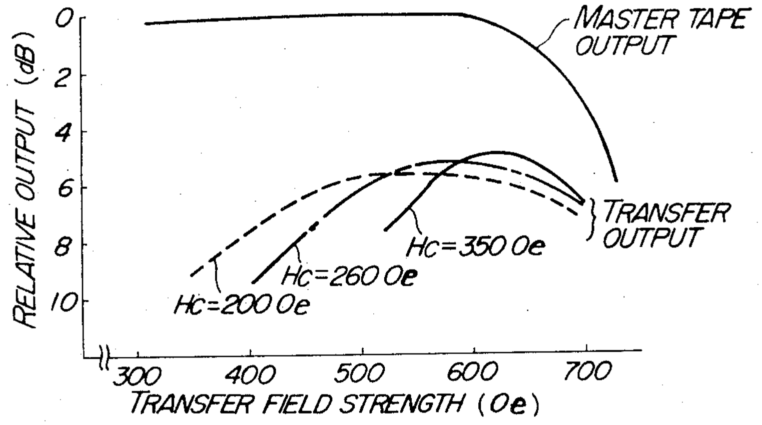
Figures 16, 17:
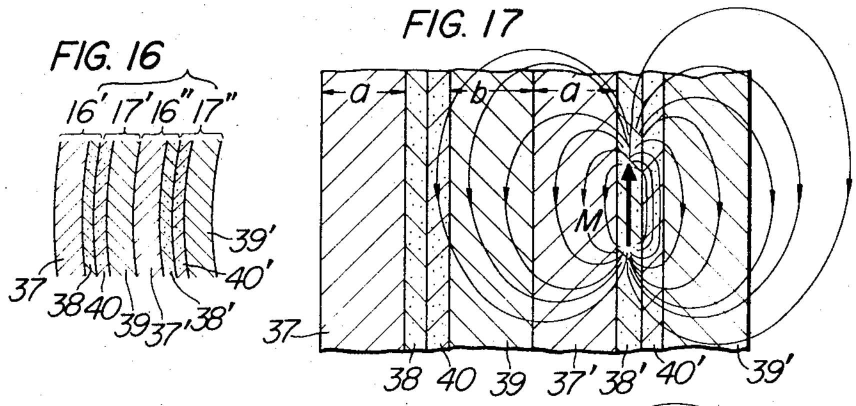
Figure 18:
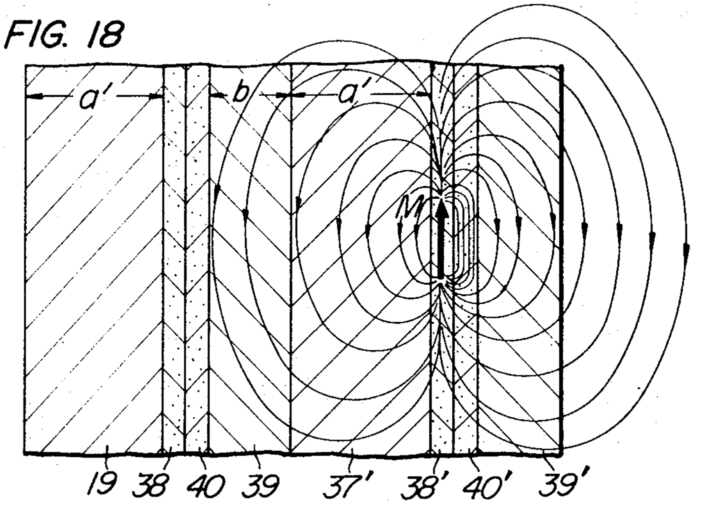
Figure 19:
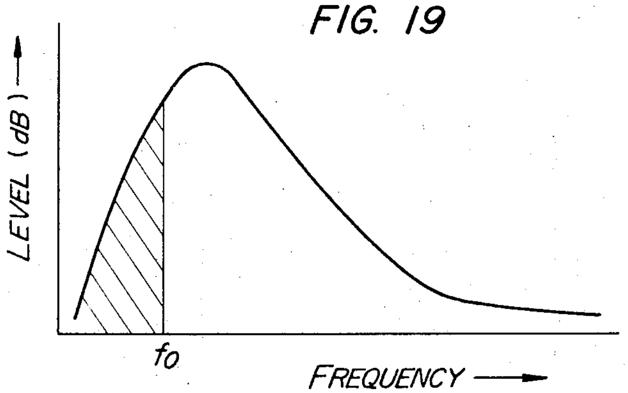

FIG. 6*a* is a side view of a guide post used in place of the capstan;

FIG. 6*b* is a plan view of another embodiment of the invention;

FIG. 7*a* is a side view of a transfer field source means;

FIG. 7*b* is a plan view of the transfer field source means shown in FIG. 7*a*;

FIG. 8 is a diagram showing a diminishing alternate magnetic field;

FIG. 9 is a side view of another form of the transfer field source means;

FIG. 10 is a front elevation of the means shown in FIG. 9;

FIG. 11*a* is a plan view of still another form of the transfer field source means;

FIG. 11*b* is a plan view of still another form of the transfer field source means;

FIG. 12 is a plan view of a driving system for the transfer field source means;

FIG. 13 is a side view of the driving system shown in FIG. 12;

FIG. 14 is a chart illustrating the relationship between the magnitude of transfer field and the transfer output;

FIG. 15 is a chart illustrating the relationship between the magnitude of transfer field and the transfer output for a given coercive force of a master tape;

FIGS. 16 and 17 are partial cross-sectional views, on an enlarged scale, of a magnetic tape roll;

FIG. 18 is a partial cross-sectional view of another magnetic tape roll for the purpose of explaining the present invention;

FIG. 19 is a chart for explaining the present invention;

FIG. 20 is a plan view of an arrangement for practicing the method of this invention;

FIG. 21 is a partial view, on an enlarged scale, of the magnetic tape roll shown in FIG. 20;

FIG. 22 is a cross-sectional side view showing an example of the master tape used in the present invention;

FIG. 23 is a partial cross-sectional view of a magnetic tape roll for the purpose of explaining the invention;

FIGS. 24, 25 and 26 are side views of means for detecting the leading or trailing end of the master tape; and FIG. 27 is a side view exemplifying means for detecting the amount of tape wound on a take-up reel.

Figure 1:
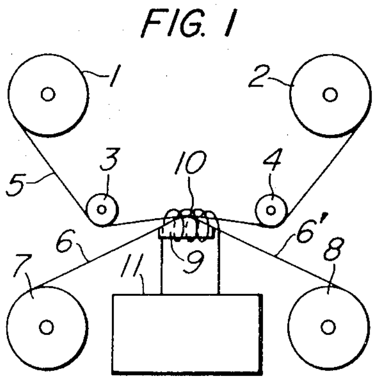
FIG. 1 is a diagrammatic plan view illustrating a conventional magnetic tape transferring method.

A conventional transferring method will be explained first hereunder. Referring to FIG. 1, reference numeral 1 designates a supply reel on which a recorded master tape is stored, 2 a take-up reel, 3 and 4 guide posts which are simultaneously adapted to control the vertical position of the tape, 5 the recorded master tape, 6 a copy tape, 6′ a portion of the copy tape on which the signal recorded on the master tape 5 has been printed, 7 a supply reel on which the copy tape is stored, 8 a printed copy tape take-up reel and 9 a tape guide by which the master tape and the copy tape are brought into close contact with each other and which simultaneously serve as means for controlling the vertical positions of the tapes. Reference numeral 10 designates a coil provided at the tape guide 9, said coil generating a high-frequency magnetic field by means of which the signal is transferred from the master tape onto the copy tape, and 11 designates a high-frequency oscillator to supply a high-frequency current to the coil 10. The well-known apparatus are basically composed as described above, but some of the apparatus which have been used heretofore employ a magnetic head, instead of the coil 10 mentioned above, for impressing a transfer field. According to the conventional methods as described above, however, the master tape and the copy tape must be in intimate contact with each other during passage through the transfer field and travel a predetermined distance at exactly the same speed in a juxtaposed state with no widthwise displacement relative to each other. Even a slight difference in running speed between the tapes will cause the transfer effect to be markedly deteriorated. For instance, in magnetically printing a video signal, the recorded waves include those of about 1 to 2 microns, so that even when the tapes are displaced as slightly as one-half micron relative to each other during passage through the transfer field, the transfer effect is deteriorated remarkably. It is for this reason that the running speeds of both tapes must be equalized with considerable accuracy. Further, the conventional methods had the drawback that the transfer effect is extremely deteriorated by an air layer which is apt to be formed between the tapes which are usually run at a considerably high speed.

Figure 2:
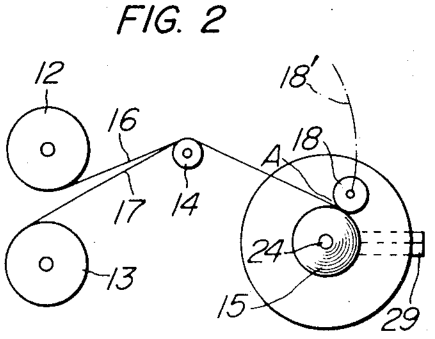
FIG. 2 is a diagrammatic plan view illustrating an embodiment of the present invention.

Now, an example of the apparatus used for practicing the method of this invention is shown in FIG. 2. In FIG. 2, reference numeral 12 designates a recorded master tape supply reel, 13 a copy tape supply reel, 14 a guide post for controlling the positions of the tapes and 15 a take-up reel on which the master tape 16 and copy tape 17 are taken up concurrently, with the magnetic coating of the respective tapes in close contact with each other. The precise vertical positions of both tapes are controlled by the guide post 14. Reference numeral 18 designates a roller which is movable along a path 18′ concentric with the guide post 14 so as to urge both tapes against the reel 24 at a point A where said tapes are brought into contact with said reel and thereby to purge air from between both tapes. The tapes may be driven by capstans as will be described later, or may alternatively be driven by directly rotating the take-up reel 15 by the drive from a motor. In this case, the rotation of the supply reels 12, 13 should be braked suitably so as to create a back-tension in the respective tapes. A transfer field is not impressed during travelling of the tapes but is impressed after a predetermined length of the contacted tapes has been taken up on the take-up reel, by a transfer field source or sources 29 provided below or above or both below and above the reel. The impression of the alternate magnetic field is effected while rotating the reel manually or automatically one or more turns at low speeds. Upon completion of the impression, both tapes are rewound on the respective reels 12, 13 and thus the transferring operation is accomplished.

Figure 5:
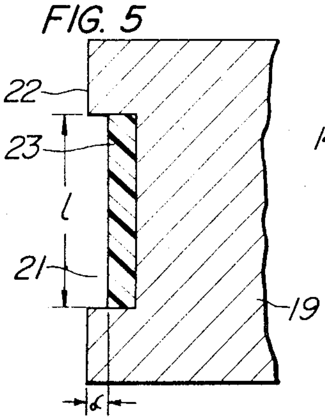
FIG. 5 is a partial cross-sectional view of the capstan shown in FIG. 3.
Figure 4:
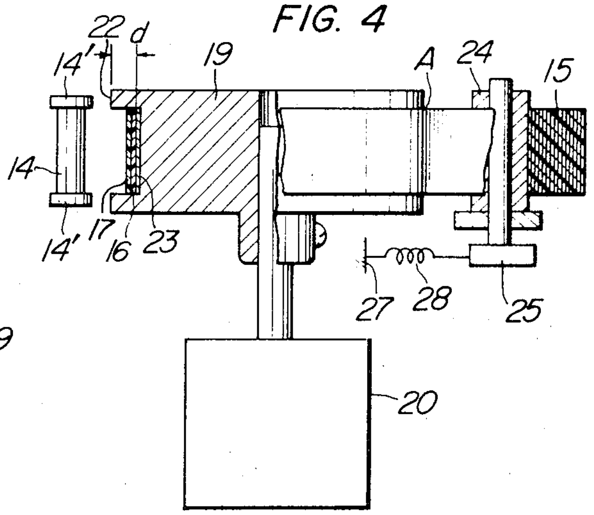
FIG. 4 is a side view, partly broken away, of a principal portion of the apparatus shown in FIG. 3.
Figure 3:
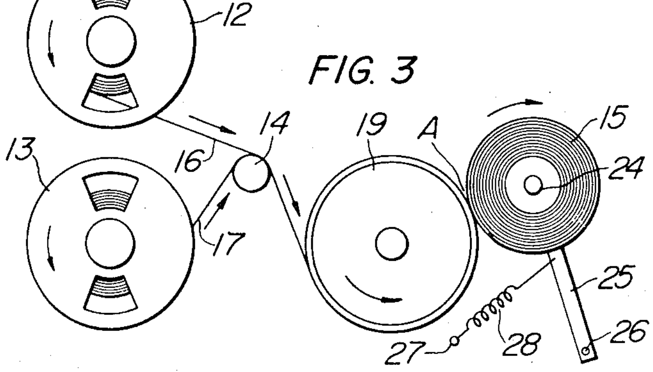
FIG. 3 is a plan view showing another embodiment of the invention.

FIGS. 3, 4 and 5 show in detail an arrangement of the master tape and copy tape driving system, wherein reference numerals 12 and 13 designate the recorded master tape supply reel and the unrecorded copy tape supply reel, 16 the recorded master tape wound on the supply reel 12 with the magnetic coating facing outwardly, and 17 the copy tape wound on the supply reel 13 with the magnetic coating facing inwardly, said master tape 16 and said copy tape 17 having the same width. Here, the positions of the master tape and copy tape may be changed in relation to each other. The guide post 14 to control the relative position of the master tape and copy tape is provided with a flange or flanges 14′ at both the upper and lower ends or at one of the upper and lower ends thereof as shown in FIG. 4, by which the master tape 16 and the copy tape 17 are completely mated widthwise. Alternately, the guide post 14 may be tapered toward the upper end thereof as shown in FIG. 6*a* and in this case the master tape and copy tape, running in engagement with the guide post, are urged upwardly by said guide post and thus the widthwise positions of both tapes are controlled by a flange of a capstan 19. The same result can be obtained when the guide post 14 is tapered toward the lower end thereof. After having the relative position defined by the guide post 14, the master tape and the copy tape are led into the capstan 19 with the respective magnetic coatings thereof in close contact with each other. The capstan is provided with a driving motor 20 therebelow. Both tapes engage a portion of the outer surface of the capstan 20 and are driven by the friction between the tape and the outer surface of the capstan. As shown in FIG. 5, the capstan 20, as an example, is provided in the outer surface thereof with a groove 21 having a width somewhat larger than the width of the master tape, and the depth of the groove 21 is preferably greater than the total width of the mated master tape and the copy tape. In the groove is provided a resilient body 23 of rubber or synthetic resin, so as to produce a greater friction between it and the tape for easy driving of said tape, said resilient body being firmly bonded to said metallic capstan by baking or another method producing the same effect. Thus, it will be understood that the master tape 16 and the copy tape 17 mated therewith pass through the groove in the capstan 19 by being driven by said capstan, while maintaining the relative position given by the guide post 14, and then are taken up by a take-up reel 24. The take-up reel 24 is rotatably mounted on a supporting arm 25 which is pivotally mounted on a pivot 26. Below the take-up reel 24 is provided a motor which serves to impart a back-tension to the respective tapes when said tapes are rewound on their supply reels upon completion of the duplication. The supporting arm 25 is biased in a direction to hold the take-up reel 24 in pressure contact with the capstan 19, under the bias of a spring 28 which is anchored at one end to said supporting arm and at the other end to a point 27. Therefore, the combined tape 15 on the take-up reel 24 is always pressed against the capstan 19 at a point A (in practice, against the tape 17 on the capstan), that is to say that the capstan 19 simultaneously serves as a tape winding idler. Further, by reason of the fact that the combined tape is pressed against the capstan at the point A, the air remaining between the master tape and the copy tape is purged to the outside, whereby a satisfactory contact is produced between said tapes. After taking up the master tape and the copy tape in the manner described, a transfer field of a suitable magnitude is impressed on said tapes to transfer the signal on the master tape onto the copy tape. The driving motor is provided below the capstan 19 as shown in FIG. 3 but may alternately be provided below the take-up reel 24, with no change in resultant effect. In case of the latter, it is possible to fix the position of the take-up reel 24 and urge the capstan 19 against the take-up reel under the bias of a spring. It is to be understood that the guide post 14 may be eliminated if the relative position of the master tape and the copy tape can be defined completely by the flange 22 only of the capstan. As will be seen from the foregoing, according to the present invention, the positions of the master tape and the copy tape can be defined completely by the guide post and the capstan, and the roll of the tapes taken up on the take-up reel is pressed against the capstan at the point A through the master tape and copy tape, so that the contact between both tapes can be much improved and, by impressing the alternate magnetic field externally under such state, the signal can be transferred in an efficient manner.

Another arrangement is shown in FIG. 6*b*, wherein reference numeral 12 designates the recorded master tape supply reel, 13 the unrecorded tape supply reel, 24 the take-up reel for taking up the master tape and the copy tape concurrently and 15 a roll of the master tape and the copy tape taken up on the take-up reel. Reference numeral 19 indicates the capstan to drive both the master tape and the copy tape, said capstan being driven by a motor.

The arrangement is such that the master tape 17 on the master tape supply reel 12, the copy tape 16 on the copy tape supply reel 13 and the magnetic tape roll 15 of the copy tape and the master tape on the take-up reel 24, are always pressed against the driving capstan 19 under the biasing force of springs 100, 100. Winding and rewinding of the tapes are all effected by the friction between the respective tapes and the capstan 19. Therefore, according to this arrangement, it is not necessary to impart a certain amount of back-tension to the supply reels, as against the conventional arrangements. In this arrangement, the unrecorded copy tape 16 is wound on the supply reel 13 with the magnetic coating facing inwardly, and pressed against the capstan 19 at a point A. Upon rotating the capstan 19, the unrecorded copy tape 16 is driven along the outer surface of said capstan and mated with the master tape 17 at a point B, with the magnetic coating of the copy tape in intimate contact with that of said master tape. Since the master tape 17 is held in pressure contact with the capstan 19 at the point B under the bias of the spring 100, an air layer is not permitted to be formed between the master tape and the copy tape and if an air layer is formed by any chance, such air layer is eliminated at a point C where both tapes are compressed between the laminate of the master tape and copy tape taken up on the take-up reel 24 and the capstan 19. Thus, a satisfactory contact is produced between the master tape and the copy tape.

Next, the manner in which the alternate magnetic field is impressed on the magnetic tape roll of the master tape and the copy tape, carried by the take-up reel 24 with the magnetic coating of the respective tapes in intimate contact with each other, will be explained. In FIG. 7*a* and 7*b*, reference numeral 29 designates transfer field source means each of which produces an alternate magnetic field when an alternating current is caused to flow through a coil 30. The transfer field source means are disposed both above and below the magnetic tape roll 15 of the master tape and the copy tape taken up on the take-up reel in substantially symmetrical relation with respect to said roll 15, or either above or below said roll. The transfer field thus produced is impressed on the tapes while rotating the tape reel slowly one or more turns. The current supplied to the exciting coil 30 may be drawn from a commercial alternating power source either directly or through a transformer, as the moving speed of the tape is slow. Alternately, the alternating current may be supplied from an oscillator. The transfer field is impressed in such a manner that the direction of the magnetic flux 31 produced by the transfer field source means becomes parallel to the longitudinal direction of the tapes as shown in FIG. 7*a*, or may be in such a manner that the magnetic flux extends perpendicularly to the longitudinal direction of the tapes, that is, in a transverse direction of the tapes. The current supplied to the coil 30 is an attenuating current and accordingly the strength of the alternate magnetic field produced by the transfer field source means diminishes gradually as shown in FIG. 8. In this case, it should be noted that the maximum value $H_B$ of the transfer field strength must be smaller than the coercive force of the master tape but larger than the coercive force of the copy tape. It is also to be noted that the transfer can be attained more effectively by impressing the transfer field on the tapes while rotating the tapes at the rate lower than the rate at which said tapes are taken up on the take-up reel 24, after a predetermined length of the tapes have been taken up, than by impressing the transfer field during the operation of taking-up the tapes on the take-up reel at a high speed. The core of the transfer field source means has a U-shaped configuration and may be disposed in such a manner as to embrace the roll of the master tape and the copy tape as shown in FIG. 9 or may be disposed at an angle to the axis of the take-up reel 24 as shown in FIG. 10.

The manner of impressing the transfer field during the operation of taking-up the master tape and copy tape on the take-up reel 24 is exemplified in FIG. 11*a*. In this case, the transfer field source means 29 must be displaced with time, for the roll 15 of the laminate of the master tape and copy tape increases in diameter as said laminate is taken up on the take-up reel. Further, it is essential to maintain the distance W between the tape roll 15 and the transfer field source means 29 constant. FIGS. 12 and 13 exemplify an arrangement which can be used for such operation. According to this arrangement, as seen, the centers of the capstan 19, the take-up reel 24 and the transfer field source means 29 are located in a straight line. A pulley 32 is provided coaxially below the take-up reel 24 and the transfer field source means 29 is mounted on a supporting stand 33. As shown in FIG. 12, the pulley 32 and the supporting stand 33 are operatively connected by way of a belt 34, and engaging with a guide slot member 35 for lateral movement therein. Further, the transfer field source means supporting stand 33 is biased toward the right, as viewed in FIGS. 12 and 13, by a spring 36. With the arrangement described, when the take-up reel 24 moves to the right, against the biasing force of a spring 28, as the roll 15 of the master tape and copy tape is taken up thereon, the transfer field source means 29 moves a distance twice as long as the moving distance of the take-up reel, whereby the distance W between the tape reel 15 and the transfer field source means 29 is maintained unchanged. The transfer field source means 29 is not necessarily located on a straight line connecting the center of the capstan 19 with the center of the take-up reel 24, but may be located at any other place provided that the distance between it and the tape roll on the take-up reel can be maintained constant. The arrangement shown in FIG. 11*a* is advantageous in duplicating a tape which has been recorded by a two head, rotary-type helical scan VTR and a tape which has been recorded by an ordinary magnetic tape recorder, by impressing a transfer field during the operation of taking up the master tape and copy tape at high speed, because the direction of the transfer field substantially coincides with the longitudinal direction of the tapes although the coil 30 must be supplied with a high-frequency current. Incidentally, the same transfer effect as obtainable from the arrangement shown in FIG. 11*a*, may be obtained by arranging, instead of the transfer field source means 29, a plurality of equally spaced permanent magnets

29' of opposite polarities in the vicinity of the tape roll 15 taken up on the take-up reel 24. Namely, by displacing the permanent magnets by the same method as used for the transfer field source means 29 in FIG. 11*a*, as the diameter of the tape roll on the take-up reel increases so as to maintain the distance between said magnets and said tape roll, the contacting surfaces of both the master tape and the copy tape undergo a diminishing alternate magnetic field similar to that shown in FIG. 8 and a satisfactory transfer result can be obtained. The same result as obtainable from the arrangement of FIG. 11 *b* may also be obtained by arranging, in place of the permanent magnets, coils each wound around a magnetic core of high permeability and low coercive force and conducting a current through said coils to produce direct-current fields of alternative polarities.

As for the relationship between the coercive force of the master tape and the transfer field, the experimental results have revealed the following:

1. When the coercive force $Hc'$ of the master tape is changed from 700 oe to 550 oe and 400 oe, for a fixed value of 260 oe of the coercive force $Hc$ of the copy tape, the relationship as shown in FIG. 14 is established between the strength of the external transfer field impressed and the transfer output. Namely, the transfer output increases to a maximum value and then decreases as the strength of the transfer field increases.

2. The absolute value of the peak point becomes greater and the strength of the transfer field to give such peak point also becomes greater as the coercive force of the master tape increases. Therefore, a transfer field of optimum strength can be obtained by selecting the coercive force of the master tape used.

3. The maximum value of the transfer output is not substantially changed when the coercive force $Hc'$ of the master tape exceeds a value three times the coercive force $Hc$ of the copy tape.

4. When the coercive force of the copy tape is changed from 200 to 260 and 350 oe, with the coercive force of the master tape fixed at 700 oe, the relationship is established as shown in FIG. 15 between the strength of the transfer field and the transfer output. Namely, the strength of the transfer field to give a maximum transfer output moves toward the increasing side as the coercive force of the copy tape increases. The strength of transfer field must be so selected as to be smaller than the coercive force of the master tape, because the signal on the master tape will be erased when the former becomes greater than the latter.

From the above experimental results, it will be understood that the optimum strength of the transfer field to give a maximum transfer output varies when the coercive forces of the master tape and the copy tape are varied, and that the strength of the transfer field is preferably smaller than the coercive force $Hc'$ of the master tape but greater than one half of the sum of the coercive force $Hc'$ of the master tape and the coercive force $Hc$ of the copy tape.

According to the method of this invention, transfer is effected by impressing a transfer field on the master tape and the copy tape after said tapes are taken up on the take-up reel in lamination as described previously. Therefore, trouble occurs as will be described hereunder. FIG. 16 is an enlarged fragmentary view, in cross-section, of the tape roll indicated at 15 in FIG. 3 and consisting of the laminate of the master tape and copy tape. In the Figure, reference numerals 16', 16'' designate individual layers of the master tape, while reference numerals 17', 17'' designate individual layers of the copy tape. Reference numerals 37, 37' designate the base of the master tape; 38, 38' the magnetic coating of the master tape; 39, 39' the base of the copy tape and 40, 40' the magnetic coating of the copy tape. As shown, the master tape and the copy tape are impressed with a transfer field in the state of a wound roll with the magnetic coating of the respective tapes in intimate contact with each other. In this case, there occurs a print-through effect as will be explained below. With reference to FIG. 17 which is a further enlargement of FIG. 16, when a remanent magnetization occurs in the magnetic coating 38' of the master tape as indicated by M, the magnetic flux produced by said remanent magnetization passes through the magnetic coating of the copy tape and said magnetic flux $\phi_{40'}$ is magnetically printed in the magnetic coating 40' of the copy tape upon impression of a transfer field. In this case, however, the magnetic flux $\phi_{40'}$ caused by the remanent magnetization M also passes through the magnetic coating 40 of the adjacent layers of the copy tape, though in a slight amount, and such a magnetic flux is occasionally magnetically printed on said layers of the copy tape upon impression of the transfer field. The magnetic flux thus printed will obviously cause a noise adversely affecting the reproduced signal. The strength of the magnetic flux $\phi_{40}$ which causes such an inter-layer print-through diminishes in the proportion of $-54\ (a+b)/\alpha$ dB wherein $a$ and $b$ represent the thicknesses of the bases of the master tape and the copy tape respectively, and $\alpha$ represents the recorded wavelength of the remanent magnetization M. Therefore, in order to minimize the inter-layer print-through, the total thickness of the bases of both tapes, i.e. $a+b$, must be made large. However, the thickness of the base of a magnetic tape generally tends to become thin so as to improve the recording capacity and hence it is not desirable to increase the thickness of the bases. Under the circumstances, the thickness $a'$ of the base 37' of the master tape is made sufficiently large as shown in FIG. 18, whereby the magnetic flux generated by the remanent magnetization M can be sufficiently diminished before it reaches the magnetic coating 40 of the adjacent copy tape and thereby the undesirable inter-layer print-through can be prevented. According to the results of a hearing test, it is apparent that music of a power density spectrum as shown in FIG. 19 will not be adversely affected if the amount of inter-layer print-through at a point $f_o$ where the power density of the low-frequency region is 30 percent of the total power density, that is, the power density of the shaded portion in FIG. 19 is 30 percent of the total power density, is no more than about −40 dB with respect to the desired amount of transfer. In view of the above, when a signal M of frequency $f_o$, recorded on the magnetic coating 38' of the master tape shown in FIG. 18, is desired to be transferred, the thickness $a$ of the base of said master tape is determined in such manner that the amount of magnetic flux to be printed onto the magnetic coating 40 of the copy tape 39 becomes −40 dB or below of the amount of magnetic flux to be transferred onto the magnetic coating 40' of the copy tape 39'. If the signal is recorded on the master tape by frequency modulation recording, the recorded wavelengths are substantially relatively short compared with those in case of direct recording, so that the influence of inter-layer print-through can be reduced. In recording a signal on the master tape by frequency modulation recording, the problem of inter-layer print-through can be eliminated by arranging such that the ratio of the recorded wavelength $\lambda_o$ of a frequency $f_1$ to be recorded, that is a frequency at which the frequency response of the reproducing system becomes −3 dB, to the total thickness D of the bases of the master tape and the copy tape, i.e. the value of $D/\lambda_o$, is greater than 0.8, because in this case the amount of leaking magnetic field diminished is 40 dB or more. The interlayer print-through may also be prevented by increasing the spacing between the tape layers in the tape reel by means of a spacer tape which is taken up simultaneously with the master tape and the copy tape. By employing this method, the same object as described above can be attained without increasing the thickness of the base of the master tape or the copy tape. The arrangement for practicing the method will be described in detail with reference to FIGS. 20 and 21. Referring first to FIG. 20, reference numeral 12 designates the recorded master tape supply reel, 13 the unrecorded copy tape supply reel and 41 a spacer tape supply reel. The master tape 16, the copy tape 17 and the spacer tape 42 supplied from said respective supply reels first engage the guide post 14 to be aligned thereby and then are led onto the guide face of the capstan 19. Obviously, the master tape 16 and the copy tape 17 are so positioned that the magnetic coating layers thereof are mated together at the guide post 14. The take-up reel 24, on which the master tape 16, the copy tape 17 and the spacer tape 42 are taken up simultaneously, is of the flangeless type and, in operation, held in pressure contact with the capstan 19 through the intermediary of the tape roll 43 wound thereon to be driven by said capstan. After taking up the spacer tape 42 simultaneously, the resultant tape roll 43 has a structure as shown in FIG. 21. Namely, in FIG. 21, reference numerals 16, 16', 16'' designate the individual layers of the master tape; 17, 17', 17'' the individual layers of the copy tape and 42, 42' the individual layers of the spacer tape. The spacer tape consists of a plastic film of a material, similar to the base of a magnetic tape, having no magnetism, or a tape having on at least one surface thereof a magnetic coating layer having a permeability higher than that of the copy tape and a coercive force smaller than that of said copy tape. By inserting the spacer tape, the spacing D between the magnetic coating 44 of the master tape 16' and the magnetic coating 45 of the adjacent copy tape 17 can be increased by a distance equal to the thickness of the spacer tape 42, as shown in FIG. 21. As mentioned previously, it has been confirmed both experimentally and theoretically that the amount of inter-layer print-through generally decreases in a proportion of $-54(D/\lambda)$dB wherein D represents the distance between tape layers and $\lambda$ represents the recorded wavelength, and from this it will be understood that the inter-layer print-through can be decreased by the insertion of the aforesaid spacer tape. Further, when a layer of magnetic coating having a permeability greater than that of the copy tape and a coercive force smaller than that of said copy tape is provided on one surface of the spacer tape by plating method, evaporation method or coating method, the unnecessary leaking magnetic flux from the master tape passes through said layer of magnetic coating and thereby magnetic print of said magnetic flux onto the adjacent layer can be decreased remarkably. The inter-layer print-through can also be minimized without using the spacer tape and without increasing the thicknesses of the bases of the master tape and the copy tape, by providing on that surface of the master tape opposite to the recorded surface a layer of magnetic coating having high permeability and low coercive force. The master tape of such a structure is shown in FIG. 22 in cross-section. In FIG. 22, reference numeral 46 generally indicates the entire master tape shown in vertical cross-section, 37 the base of synthetic resin and 47 the magnetic coating layer provided for the prevention of inter-layer print-through and consisting of a film of a metal, such as, for example, iron or nickel, having low coercive force and high permeability, or an alloy thereof, said magnetic coating layer being formed on one surface of said master tape by such means as plating. Reference numeral 38 designates the magnetic coating on which a signal is recorded. The structure of the tape roll formed on the take-up reel by taking up the recorded master tape of the structure shown in FIG. 22 and the unrecorded copy tape, is partially shown in FIG. 23 in cross-section on an enlarged scale. In FIG. 23, reference numerals 46, 46' designate the individual layers of the master tape shown in FIG. 22; 17, 17' the individual layers of the copy tape; 39, 39' the bases of the respective layers of copy tape and 40, 40' the magnetic coatings of the respective layers of copy tape. Now, supposing that a remanent magnetization M is present in the magnetic coating 38 of master tape 46, the magnetic flux produced by said remanent magnetization M is transferred onto the magnetic coating 40 of the unrecorded copy tape 39 upon impression of an external transfer bias field, but at the same time the magnetic flux passes through the magnetic coating 40' of the copy tape 39' as indicated by the dotted line in FIG. 23. However, when the magnetic coating layer 47 of high permeability and low coercive force is provided on the back-side of the master tape 46 as described above, the magnetic flux tending to pass through the adjacent tape layer is entirely shielded by said magnetic coating layer as indicated by the solid lines and thus the inter-layer print-through is prevented. In this case, however, the thickness of the shielding magnetic coating layer 47 must be suitably selected relative to the permeability thereof, because too large a thickness will result in absorption of the magnetic flux from the master tape by the shielding magnetic coating layer.

In the duplication of a magnetic tape according to the method of this invention, the step of taking up the master tape and the unrecorded copy tape, the step of impressing a transfer field on the tapes and the step of rewinding said tapes, can be carried out automatically, for example, by the following method: Namely, referring to FIG. 3, a predetermined length of a transparent tape, a tape of high light reflection factor, such as an aluminum tape, a tape of high electrical conductivity or a tape having a thin layer of high electrical conductivity formed on the surfaces thereof, is provided in each of the leading and trailing end portions of the master tape, while on the other hand means is provided to detect the leading and trailing ends of the master tape by means of a light passing through or reflecting from the tape or a current conducting through the tape depending upon the type of tape used for the detection. With such provisions, it is possible to control the operation of the apparatus electrically. FIG. 24 illustrates the arrangement for detecting the position of the tape which has a transparent tape section 48 provided therein. As shown, a light source 49 and a photosensitive element, such as a phototransistor or photomultiplier 50 are arranged in opposed relation on both sides of the master tape, so that when the transparent tape section 48 is located in front of the light source, a light 51 passing through said transparent tape section is received by the photosensitive element 50 and the operation of the tape driving system is stopped or reversed, or a current is supplied to the transfer field source means for a predetermined period, in response to a signal emitted by said photosensitive element. FIG. 25 illustrates the arrangement for detecting the position of the master tape by making use of the light reflected from a light reflecting tape section 52, while FIG. 26 illustrates the arrangement for detecting the position of the master tape, wherein use is made of a current flowing through contacts 54, 55 via an electrically conductive tape section 53. Alternatively, the positions of the tapes may be detected by measuring the amounts of the tapes having been taken up on the take-up reel. Namely, according to this method, as shown in FIG. 27, switches 57 and 58 are provided below the take-up reel 24. The take-up reel 24 is pressed against the capstan 19 through the tape roll 15 formed thereon which is composed of the master tape and the copy tape, so that it moves in the directions indicated by the arrows 56 as the radial width L of said tape roll varies. Therefore, when the radial width L of the tape roll, that is, the amounts of the master tape and the copy tape taken up on the take-up reel, has reached a predetermined value, the take-up reel comes in contact with the microswitch 57 at a portion thereof to actuate the same, whereby the operation of the tape driving system is reversed and also the transfer field is impressed on the tape roll for a predetermined period at a point when the rotating speed of the take-up reel has been slowed down. As is obvious, a certain length of the master tape and the copy tape must be retained on the respective supply reels at the time when the microswitch 57 is actuated. On the other hand, when the master tape and the copy tape have been rewound and the radial width L of the tape roll has been reduced to a predetermined value, the take-up reel comes in contact with the microswitch 58 at its portion to actuate the same, and thereby the tape driving system is made to stop operating. As will be appreciated, the master tape must be slightly longer than the copy tape, so that a certain length of the master tape will remain on the take-up reel when the operation of the tape driving system has been stopped, with the recorded copy tape completely rewound on its supply reel. This is true when the position detecting tape section is used as described previously. The arrangements shown in FIGS. 24 to 27 inclusive are also applicable when the spacer tape is used. The spacer tape is only required to be provided in a length substantially the same as the length of the master tape.

What is claimed is:

1. A method of duplicating a magnetic tape, comprising the steps of: winding a master tape having a signal recorded thereon in mirror-image relation to a signal to be duplicated onto a take-up reel; winding a copy tape of smaller coercive force than said master tape onto said take-up reel substantially simultaneously with said master tape, wherein the magnetic media of said master and copy tapes are in contact with each other; impressing a diminishing alternating transfer magnetic field of a strength smaller than the coercive force of said master tape and greater than the coercive force of said copy tape onto the portions of said tapes on said take-up reels; concurrently maintaining one end portion of at least one of said master and copy tapes on its supply reel; and transferring said recorded signal from said portion of said master onto said portion of said copy tape.

2. A method of duplicating a magnetic tape as defined in claim 1, comprising the further step of rotating said take-up reel at a rate lower than that at which said tapes are wound on said take-up reel while said magnetic field is being impressed on said master and copy tapes.

3. A method of duplicating a magnetic tape as defined in claim 1, comprising the further step of: applying a shielding layer to the side of said master tape opposite the magnetic media side thereof, said last-mentioned step including the further step of winding a magnetic material of a permeability higher than that of the magnetic media on said master tape and a coercive force smaller than that of said master tape magnetic media onto said take-up reel in contact with the opposite side of said master tape.

4. A method of duplicating a magnetic tape as defined in claim 1, comprising the further steps of: winding said master and copy tapes about a tapered guide post through a predetermined angle to form said laminate; passing said laminate around a rotary body; and aligning said master and copy tapes by driving said tapes toward a flange disposed on one end of said rotary body.

5. A method of duplicating a magnetic tape as defined in claim 1, comprising the further step of beginning said impressing step when a predetermined length of said master and copy tapes have been wound on said take-up reel and a portion of each said tape remains on its respective supply reel.

6. A method of duplicating a magnetic tape as defined in claim 1, comprising the further step of maintaining a substantially constant distance between said transfer magnetic field means and the tape roll being wound on said take-up reel by displacing said transfer magnetic field means relative to said take-up reel.

7. A method of duplicating a magnetic tape as claimed in claim 1 further comprising the step of winding said master tape and said copy tape around a tapered guide post through a predetermined angle to thereby form a laminate of said tapes with the magnetic media of the respective tapes in contact with each other, successively thereafter passing said laminate of tapes around and in engagement with a rotary body through a predetermined angle to drive said tapes toward one end of the rotary body to effect alignment of the tapes and thereafter winding the laminate of tapes on said take-up roll.

8. A method of duplicating a magnetic tape as claimed in claim 1, further comprising the step of exerting a bias force against said tapes in the vicinity of the point at which the tapes first engage said take-up reel to thereby form a close contact between said tapes.

9. A method of duplicating a magnetic tape as claimed in claim 1 further comprising the step of winding a spacer tape along with the master tape and copy tape with said spacer tape being located on the base side of one of said tapes and wound up together therewith on said take-up reel.

10. A method of duplicating a magnetic tape as claimed in claim 1, comprising the step of making the strength of the transfer field greater than one half the sum of the coercive force of said master tape and said copy tape but smaller than the coercive force of said master tape.

11. An apparatus for duplicating a magnetic tape, comprising: a master tape having a signal recorded thereon wound on a first reel; a copy tape having a coercive force smaller than the coercive force of said master tape wound on a second reel; a take-up reel; means for winding a laminate of said master and copy tapes onto said take-up reel, including means for forming and controlling the position of said laminate wherein the magnetic media of said master and copy tapes are disposed in contact with each other; means for maintaining one end portion of at least one of said master and copy tapes on its supply reel; and means transferring said recorded signal from said master tape to said copy tape, including means disposed adjacent said take-up reel for applying a diminishing alternating transfer magnetic field to the roll of said laminate wound on said take-up reel.

12. An apparatus according to claim 11, wherein said master tape is longer than said copy tape and remains operatively connected to said take-up reel after said copy tape has been rewound on its reel.

13. An apparatus as defined in claim 11, wherein said rotary body is further disposed in contact with said master and copy tapes wound on their respective reels.

14. An apparatus as defined in claim 11, further comprising means to maintain a substantially constant distance between said transfer means and said laminate being wound on said take-up reel.

15. An apparatus for duplicating a magnetic tape as claimed in claim 11, wherein the base of said master tape is greater in thickness than the base of said copy tape.

16. An apparatus for duplicating a magnetic tape as claimed in claim 11, wherein the total thickness of the bases of the master tape and the copy tape is such that when a signal of a frequency at a point where the power density of the low-frequency region of the power density spectrum of the signal on the master tape is 30 percent of the total power density, is recorded, the amount of inter-layer print-through of said signal becomes no greater than −40 dB compared with the desired amount of transfer.

17. An apparatus for duplicating a magnetic tape as claimed in claim 11, wherein the master tape is recorded with a signal of modulated frequency and the frequency resonance of a reproducing system for the recorded copy tape and the total thickness of the master tape and the copy tape are determined such that when a frequency at a point where the frequency resonance of the reproducing system is −3 dB, is recorded, the ratio $D/\lambda_0$ of said recorded wavelength $\lambda_0$ to the total thickness D of the master tape and the copy tape becomes no smaller than 0.8.

18. An apparatus for duplicating a magnetic tape as claimed in claim 11, wherein said transfer magnetic field generating and applying means includes a plurality of substantially equally spaced permanent magnets of alternative polarities which are positioned adjacent to the tape roll being formed on said take-up reel, and are movable as the radial width of said tape roll increases so that the distance between said magnets and said tape roll is maintained constant.

19. An apparatus for duplicating a magnetic tape as claimed in claim 11, wherein a position detecting tape section is provided at least at one of the leading end portion and the trailing end portion of the master tape and copy tape.

20. An apparatus according to claim 11, wherein said forming means includes a tapered guide post; further comprising a rotary body around which said laminate is passed through a predetermined angle and disposed in contact with the portion of the laminate wound on said take-up reel; and wherein said guide post, said rotary body and said take-up reel have their respective axes disposed substantially parallel to each other.

21. An apparatus according to claim 20, wherein said rotary body has a flange disposed on one end thereof corresponding to the smaller diameter of said tapered guide post.

22. An apparatus as defined in claim 11, further comprising a spacer tape wound on a third reel, said spacer tape being disposed in said laminate on a side opposite the magnetic media side of one of said master and copy tapes.

23. The apparatus as defined in claim 22, wherein said master and spacer tapes are longer than said copy tape and remain operatively connected to said take-up reel after said copy tape has been rewound on its reel.

24. An apparatus as defined in claim 22, wherein said spacer tape has a layer of magnetic media with a permeability greater than that of the other tapes and a coercive force smaller than that of said other tapes, whereby inter-layer print-through during duplication is prevented.

25. An apparatus for duplicating a magnetic tape as claimed in claim 22, wherein said master tape and said spacer tape are longer than said copy tape so that when said tapes are rewound on their respective reels upon completion of the duplication, portions of said master tape and said spacer tape may remain on the take-up reel, while said copy tape has been completely rewound on its reel.

* * * * *